United States Patent
Vakkachen et al.

(10) Patent No.: US 11,659,352 B2
(45) Date of Patent: May 23, 2023

(54) METHOD AND APPARATUS FOR GEOFENCE EVENT PREDICTIONS

(71) Applicant: PHUNWARE, INC., Austin, TX (US)

(72) Inventors: Anu Vakkachen, Cedar Park, TX (US); Seshu Vavilikolanu, Austin, TX (US)

(73) Assignee: PHUNWARE, INC., Austin, TX (US)

( * ) Notice: Subject to any disclaimer, the term of this patent is extended or adjusted under 35 U.S.C. 154(b) by 0 days.

(21) Appl. No.: 17/362,765

(22) Filed: Jun. 29, 2021

(65) Prior Publication Data

US 2022/0417699 A1     Dec. 29, 2022

(51) Int. Cl.
*H04W 4/021*      (2018.01)
*H04W 4/02*       (2018.01)
*H04W 4/029*      (2018.01)
*H04W 4/80*       (2018.01)

(52) U.S. Cl.
CPC .......... *H04W 4/021* (2013.01); *H04W 4/027* (2013.01); *H04W 4/029* (2018.02); *H04W 4/80* (2018.02)

(58) Field of Classification Search
CPC ..... H04W 4/021; H04W 4/023; H04W 4/027; H04W 4/029; H04W 4/12; H04W 4/80
See application file for complete search history.

(56) References Cited

U.S. PATENT DOCUMENTS

| | | | |
|---|---|---|---|
| 8,812,027 B2 | 8/2014 | Obermeyer et al. | |
| 9,648,581 B1* | 5/2017 | Vaynblat | H04L 67/535 |
| 10,038,972 B1 | 7/2018 | Feng et al. | |
| 10,171,940 B1* | 1/2019 | Greenberger | H04W 4/027 |
| 10,492,025 B2 | 11/2019 | Kong et al. | |
| 2005/0159883 A1* | 7/2005 | Humphries | B60R 25/33 340/995.21 |
| 2014/0066101 A1* | 3/2014 | Lyman | H04L 67/52 455/456.3 |
| 2014/0370910 A1* | 12/2014 | Natucci, Jr. | H04W 4/022 455/456.1 |
| 2015/0011237 A1 | 1/2015 | Obermeyer et al. | |
| 2015/0039393 A1 | 2/2015 | Jain | |
| 2016/0066141 A1 | 3/2016 | Jain et al. | |
| 2016/0266258 A1* | 9/2016 | Huang | G01S 19/34 |
| 2016/0353239 A1* | 12/2016 | Kjellsson | G07C 9/00309 |
| 2018/0195867 A1 | 7/2018 | Ortiz et al. | |
| 2018/0299152 A1* | 10/2018 | Libal | H04W 4/021 |
| 2019/0098443 A1* | 3/2019 | DeLuca | H04W 4/027 |
| 2019/0098448 A1 | 3/2019 | Jain et al. | |
| 2020/0279446 A1* | 9/2020 | Hage | E05B 39/005 |
| 2021/0095986 A1 | 4/2021 | Brown | |
| 2021/0144509 A1 | 5/2021 | Hicks et al. | |

* cited by examiner

*Primary Examiner* — Jean A Gelin

(74) *Attorney, Agent, or Firm* — TIPS Group

(57) ABSTRACT

A geofence event prediction method includes retrieving non-contemporaneous geofence predictor data of a mobile device, retrieving geofence data of the mobile device, and developing a future geofence event prediction from the non-contemporaneous geofence predictor data and the geofence data. In an embodiment, retrieving non-contemporaneous geofence predictor data includes retrieving at least one of past geographic location data and future geographic location data.

16 Claims, 5 Drawing Sheets

METHOD AND APPARATUS FOR GEOFENCE EVENT PREDICTIONS

BACKGROUND

Geofencing refers to establishing a virtual representation of a bounded geographical region, and then determining when a user or a user's computing device enters or leaves that bounded geographical region. The bounded geographical region is referred to as a geofence. Typically, a user's computing device itself determines when the computing device has entered or left a geofence. This requires that the user computing device, be informed of the bounds of one or more geofences, and that the user computing device be capable of determining when the user computing device has entered or left one of the geofences by comparing, the current position of the user computing device to the boundaries of known geofences.

Mobile computing devices, such as smartphones, tablets and laptop computers are by their nature portable and expected to move about. Android Geofencing combines awareness of the user's current location with awareness of the user's proximity to locations that may be of interest. To mark a location of interest, you specify its latitude and longitude. To adjust the proximity for the location, you add a radius. The latitude, longitude, and radius define a geofence, creating a circular area, or fence, around the location of interest. You can have multiple active geofences, with a limit of 100 per app, per device user. For each geofence, you can ask Location Services to send you entrance and exit events, or you can specify a duration within the geofence area to wait, or dwell, before triggering an event. You can lint the duration of any geofence by specifying an expiration duration in milliseconds. After the geofence expires, Location Services automatically removes it.

A software application on a mobile computing device must be informed of what geofences are deemed relevant so that the software application can in turn register the geofencing information with the operating system on the mobile computing device. Ideally, the software application would be updated with new geofencing information as the mobile computing device moves from one location to another, so that the geofences surrounding the mobile computing device's current location are the ones registered with the operating system of the mobile computing device.

A drawback of geofencing is that a geofence event is generated only when the mobile device physically crosses a geofence boundary. This provides a very limited time to respond to the geofence event. There have been a number of attempts to address this problem by providing a prediction as to whether a mobile device of a pedestrian or driver will soon cross a geofence. However, the accuracy of these prior prediction attempts tend to be inversely proportional to the distance of the pedestrian or driver from the geofence. That is, if the pedestrian or driver is very close to a geofence the prediction can be reasonably accurate, but if the pedestrian or driver is travelling from far away the prediction tends to be less reliable. Therefore, the advantage of early warning of an upcoming geofence event is relatively limited with these prior art attempts.

These and other limitations of the prior art will become apparent to those of skill in the art upon a reading of the following descriptions and a study of the several figures of the drawing.

SUMMARY

An example geofence event prediction method includes retrieving non-contemporaneous geofence predictor data of a mobile device, retrieving geofence data of the mobile device, and developing a future geofence event prediction from the non-contemporaneous geofence predictor data and the geofence data. In an embodiment, retrieving non-contemporaneous geofence predictor data includes retrieving at least one of past geographic location data and future geographic location data.

An example non-transitory computer readable media including code segments executable on a digital processor includes code segments for retrieving non-contemporaneous geofence predictor data of a mobile device, retrieving geofence data of the mobile device, and developing a future geofence event prediction from the non-contemporaneous geofence predictor data and the geofence data.

An example mobile device with geofence event prediction includes a digital processor, a GPS unit coupled to the digital processor, a WiFi unit coupled to the digital processor, a Bluetooth unit coupled to the digital processor, an accelerometer coupled to the digital processor, and non-transitory computer readable including code segments executable on the digital processor. In an embodiment, there are code segments for retrieving non-contemporaneous geofence predictor data of a mobile device, retrieving geofence data of the mobile device, and developing a future geofence event prediction from the non-contemporaneous geofence predictor data and the geofence data.

An advantage of embodiments disclosed herein is that accurate geofence event predictions can be made based upon non-contemporaneous predictor data.

These and other embodiments, features and advantages will become apparent to those of skill in the art upon a reading of the following descriptions and a study of the several figures of the drawing.

BRIEF DESCRIPTION OF THE DRAWINGS

Several example embodiments will now be described with reference to the drawings, wherein like components are provided with like reference numerals. The example embodiments are intended to illustrate, but not to limit, the invention. The drawings include the following figures.

DETAILED DESCRIPTION OF EXAMPLE EMBODIMENT(S)

Figure 1:
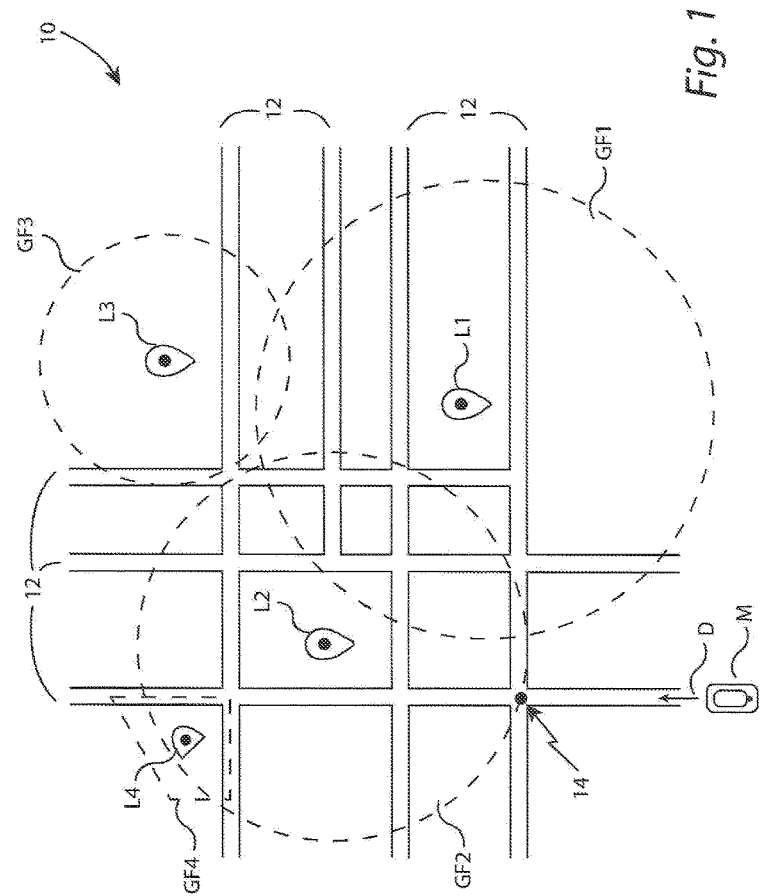
FIG. 1 is a map illustrating an example environment for using predictive geofence technology.

FIG. 1 is an example map 10 illustrating an environment for using predictive geofence technology. The map shows a number of roads 12 and a number of geographic locations, e.g. L1, L2, L3 and L4. Surrounding the locations are geofences GF1, GF2, GF3 and GF4, respectively. As used herein, a "geofence" is a closed, virtual fence around a location, and can be of many sizes and shapes including, but not limited to, circular and polygonal. In this example, geofences GF1, GF2 and GF3 are circular with the corresponding locations L1, L2 and L3 at their centers and geofence GF4 is polygonal with location L4 located at some point within. Other configurations of geofences and locations within geofences are also applicable, as will be appreciated by those of skill in the art.

As noted above, a geofence is a virtual perimeter surrounding a geographical location and is implemented by application code ("app") executing on a mobile device. The geographical location the mobile device can be detected in a number of ways, including the use of GPS, Bluetooth, cell phone tower and WiFi signals received by the mobile device. Movement of the mobile device can be detected by a change in location, of the mobile device over tune and by more direct methods such as the use of an accelerometer.

When the location of a mobile device crosses a geofence an event, also referred to herein as a "geofence event," occurs. See, for example, a mobile device M traveling along a road 12 in a direction D. When it reaches geofence GF2, a geofence event 14 occurs. The metadata associated with geofence event 14 typically includes location (e.g. latitude and longitude), date and time of the geofence event.

A geofence event can be handled in a number of ways, e.g. by the application code executing on the mobile device or by a remote server that is communication with the mobile device. For, example, an interne server can be in communication with the mobile device via cellular or WiFi data communication. The server can then process the geofence event to, for example, log the movement of the mobile device into and out of the geofence.

Figure 2:
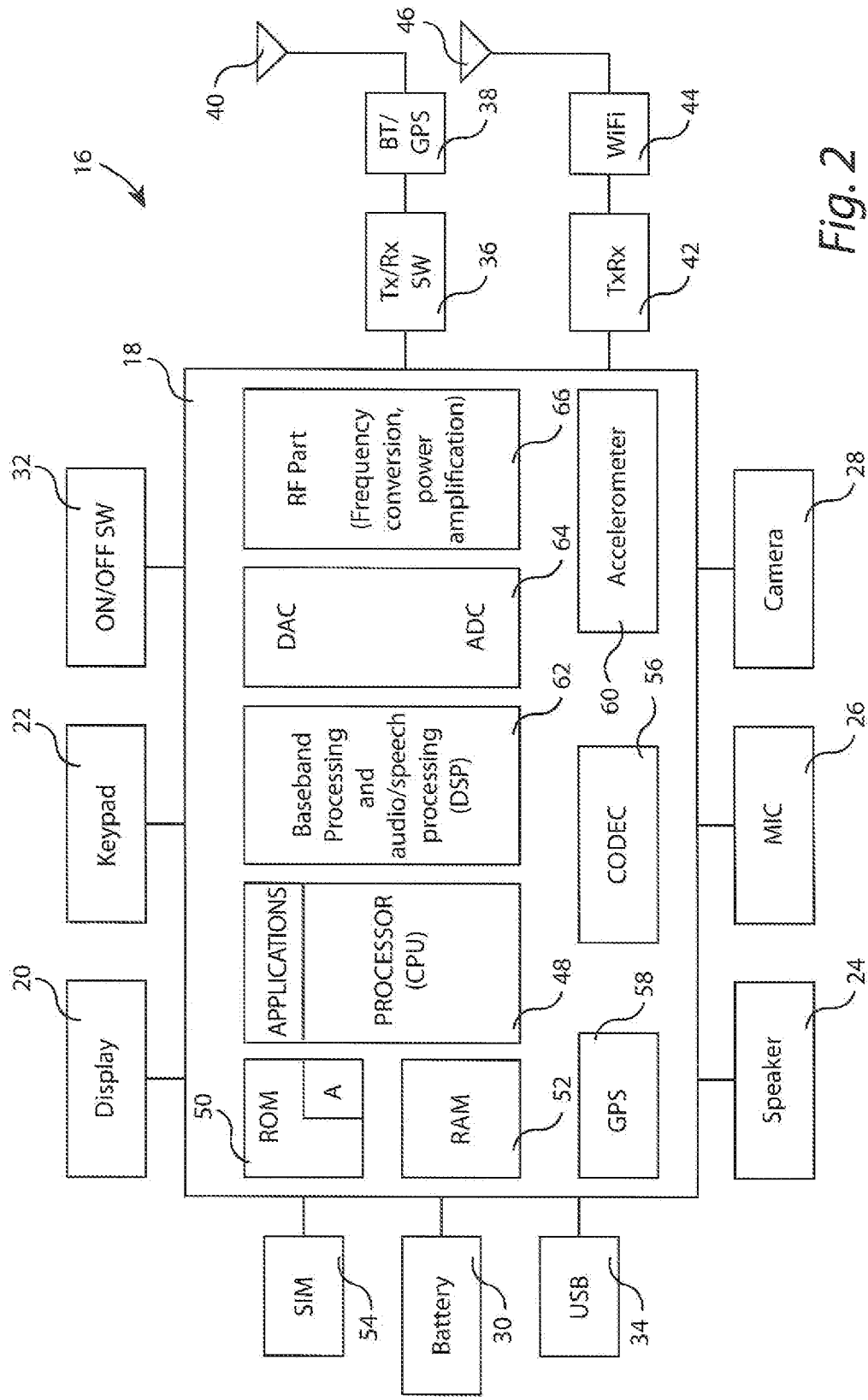
FIG. 2 is a block diagram of an example mobile device incorporating predictive geofence technology.

FIG. 2 is a block diagram of an example mobile device incorporating predictive geofence technology. In this non-limiting example, the mobile device comprises a cell phone 16 including main circuitry 18 and input/output (I/O) components such as a display 20, a keypad 22, a speaker 24, a microphone 26 and a camera 28. Main, circuitry 16 is powered by a battery 30 and is turned on and off with a switch 32. In this example embodiment, the main circuitry 16 is provided with a universal serial bus (USB) 34. A transmit/receive (Tx/Rx) switch 36 and a Bluetooth/GPS (RT/GPS) module 38 couple an antenna 40 to the main circuitry 16 and a Tx/Rx switch 42 and a WiFi module 44 couple an antenna 46 to the main circuitry.

Main circuitry 18 of cell phone 16 includes a processor (CPU) 48, capable of running application code (apps) and read only memory (ROM) 50 coupled to the CPU 48. In this non-limiting example, an app "A" is stored in ROM 50, which can be, for example, an electrically erasable, programmable read only memory (EEPROM) or flash memory. Other memory include random access memory (RAM) 52, and a removable subscriber identity module (SIM) 54 which identifies the subscriber and device. The example main circuitry 18 also includes a CODEC 56, a GPS processor 58, an accelerometer 60, a baseband processing and audio/speech processing digital signal processor (DSP) 62, a digital to analog converter (DAC) and analog to digital converter (ADC) 64, and a RF part 66 for frequency conversion, power amplification, etc. Other cell phone and mobile device architectures are also applicable.

Figure 3:
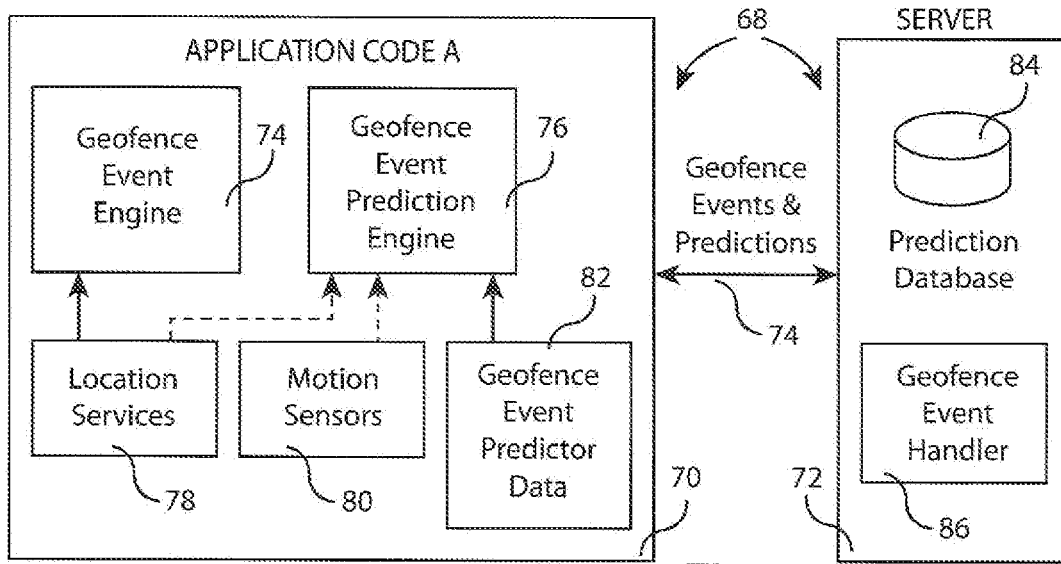
FIG. 3 is a block diagram of an example system implementing predictive geofence technology.

FIG. 3 is a block diagram of an example geofence predictor system 68 including a mobile device 70 and a server 72 which communicate via a wide area network connection 74, e.g. through the cellular system and/or the internet. In this non-limiting example, the mobile device 70 is executing application code A including a geofence event engine 74 and a geofence event prediction engine 76. For example, the application program A can be stored in non-transitory computer readable media, e.g. ROM 50 of FIG. 2. In this example, geofence event engine 74 receives location data from a locations services module 78 to monitor for geofence events. Geofence event prediction engine 76, in this example, can receive data from the location services module, from motion sensors 80, and from geofence event predictor data 82 to predict future geofence events. The server 72, in this example, includes a prediction database 84 and a geofence event handler 86. It should be noted that server 72 is designed to handle a large number of mobile device communications such that geofence events and future geofence event predictions can be handled concurrently for multiple mobile devices.

Figure 4:
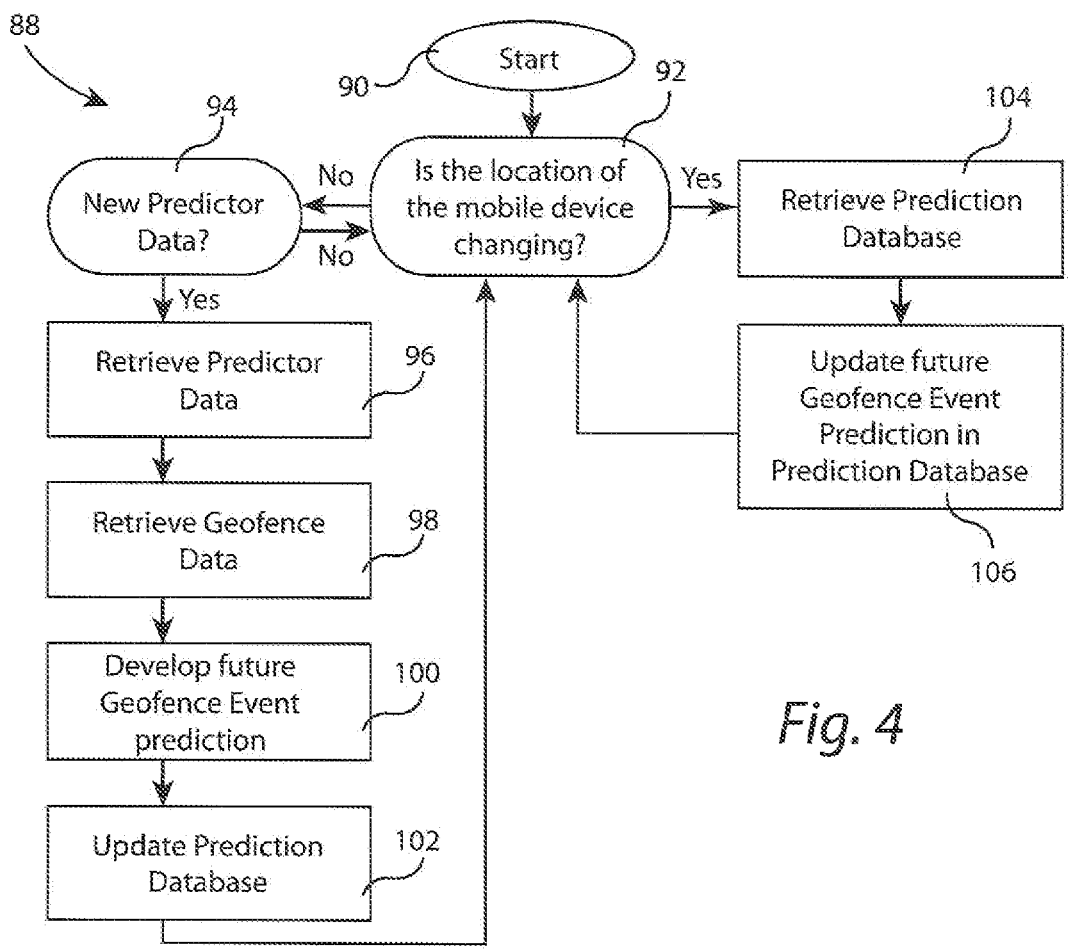
FIG. 4 is a flow diagram of an example geofence event prediction method.

FIG. 4 is a flow diagram of an example geofence event prediction method 88 that can be implemented with application code of a mobile device. Process 88 begins at 90 and, in an operation 92, it is determined whether the location of the mobile device is changing in a substantial manner. That is, by "changing" it is meant that the mobile device is travelling a significant distance from one geographic location to another, e.g. by a person walking or driving with the mobile device, as opposed to a person simply operating the device to, for example, make a telephone call. If the location is not changing substantially, an operation 94 determines if there is new predictor data available. If operation 94 determines that there is new predictor data, it is retrieved in an operation 96. By way of example, a new calendar entry is an example of a new predictor data. Next, in an operation 98, geofence data is retrieved by the application code. Future geofence event predictions are developed in operation 100, and the prediction, database is updated in an operation 102 before control returns to operation 92. If operation 92 determines that the location of the mobile device is changing, the predictor database is accessed or "retrieved" in an operation 104. Then, using concurrent location data, e.g. from GPS, Bluetooth, WiFi, cellular towers, etc. the prediction database is updated in an operation 106 before process control returns to 92.

By "concurrent location data" it is meant real-time location data related to the mobile device. Furthermore, as used herein, "non-contemporaneous geofence predictor data" or simply "predictor data" includes past data (e.g. historical location data and future data e.g. such as appointments on a calendar). That is, predictor data relates to either historical past or planned future locations of the mobile device and is therefore distinguishable from concurrent location data.

Figure 5:
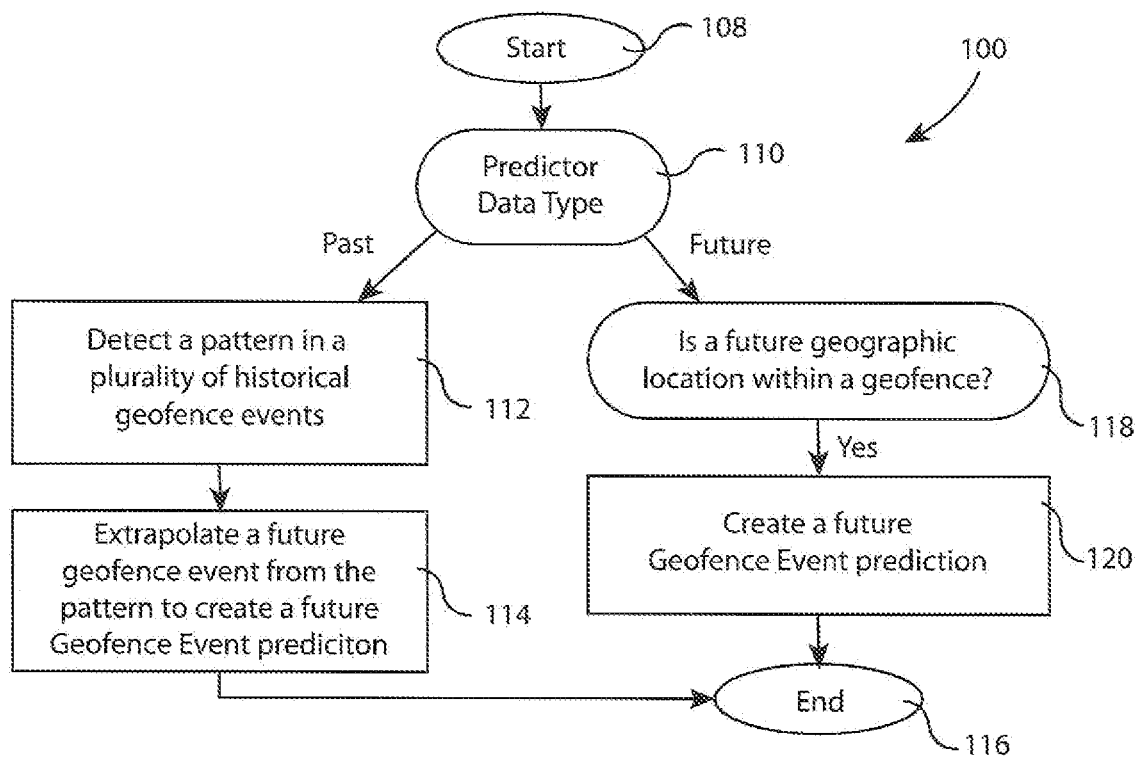
FIG. 5 is a flow diagram of an example method For developing future geofence event predictions of FIG. 4.

FIG. 5 is a flow diagram of an example method 100 for developing future geofence event predictions. Process 100 begins at 108 and, in an operation 110 it is determined what is the type of the new predictor data. If it is past predictor data, e.g. past or "historical" geofence events, an operation 112 attempts to detect a pattern in the historical geofence events. Pattern detection normally requires at least two related historical geofence events and gets more accurate with a larger data set. For example, if an analysis of the historical geofence events indicates that there was a geofence event at approximately the same time and location on business days, a pattern is developed that may relate to the work commute travel of the owner of the mobile device. Next in an operation 114, the detected pattern is used to extrapolate a future geofence event on the next business day for the user. Process would then end at 116.

If operation 110 determines that it is future predictor data, e.g. a calendar entry, an operation 118 attempts to determine whether the calendar entry corresponds to a geographic location that is within, a geofence. For example, if the new calendar entry was a doctor's appointment at 123 Main Street, Anytown USA, the geographical location of the doctor's office can be converted to latitude and longitude and compared with the latitude and longitude coordinates of the geofence. If the calendar entry does correspond to a geographic location that is within the geofence, a new future geofence event prediction can be made in an operation 120 or, in the event that the calendar entry is repeated, multiple new future geofence event predictions can be made. The process 100 then ends at 116.

Figure 6:
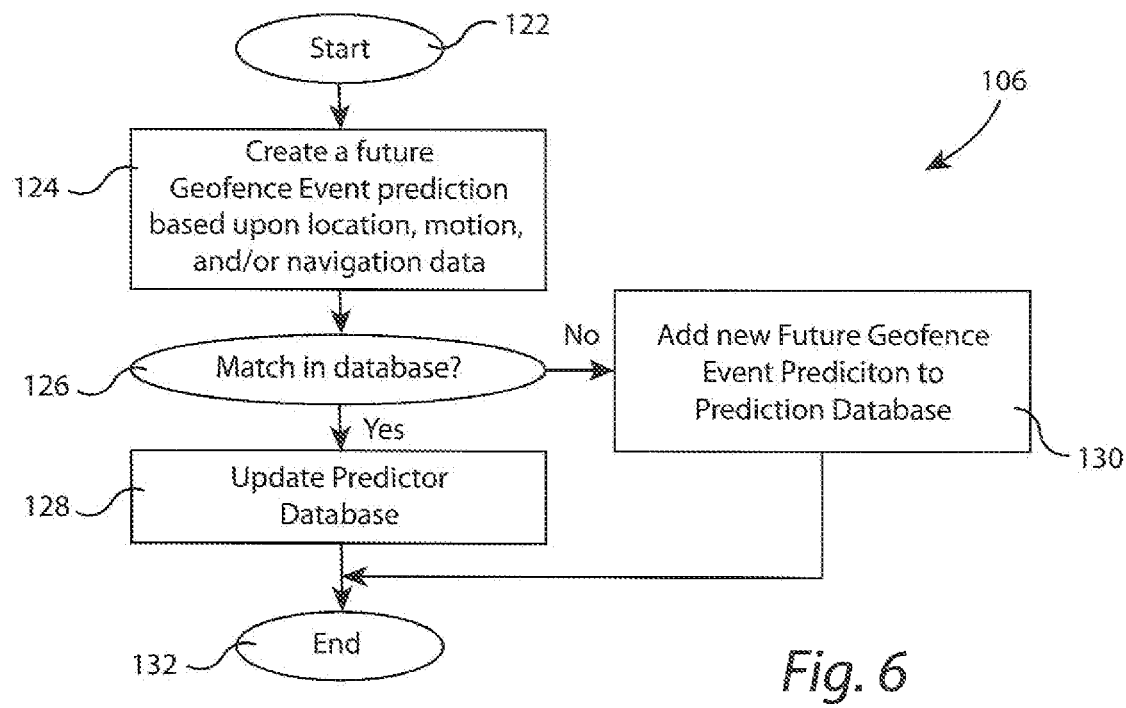
FIG. 6 is a flow diagram of an example method for updating a future geofence event prediction database of FIG. 4.

FIG. 6 is a flow diagram of an example method 106 for updating a prediction database. It should be noted that the prediction database can be on the mobile device, the server, or distributed on the mobile device, the server and/or elsewhere on the internet. Furthermore, the prediction database can be related to a single mobile device or user or may include data from multiple mobile devices or users.

Process 106 starts at 122 and, in an operation 124, a tentative geofence event prediction based upon location, motion and/or navigation data is made. For example, GPS data can show the movement of the mobile device in the direction of a geofence, and the tentative geofence event can be calculated by the distance, direction, and velocity of the movement. This prediction can be made more accurate by using navigation information, which may include route information, acceleration data, etc. Next, then tentative geofence event prediction is mapped to a prediction database. By "mapped", it is meant that the parameters of the tentative geofence event are compared to the parameters of geofence prediction events already in the prediction database. If the tentative geofence event prediction is within a tolerance level of a current geofence prediction (e.g. if the location and time of the predicted geofence event is relatively close) as determined by operation 126 they are considered to be a "match" and the prediction database is updated in an operation 128. For example, if there is a match within acceptable tolerances between the tentative geofence prediction and the current geofence prediction, the current geofence prediction can be updated to in include a more accurate time and location for the predicted geofence event. If operation 126 does not find a close match, a new future geofence event prediction is added to the database. Process 106 then ends at 132.

Figure 7:
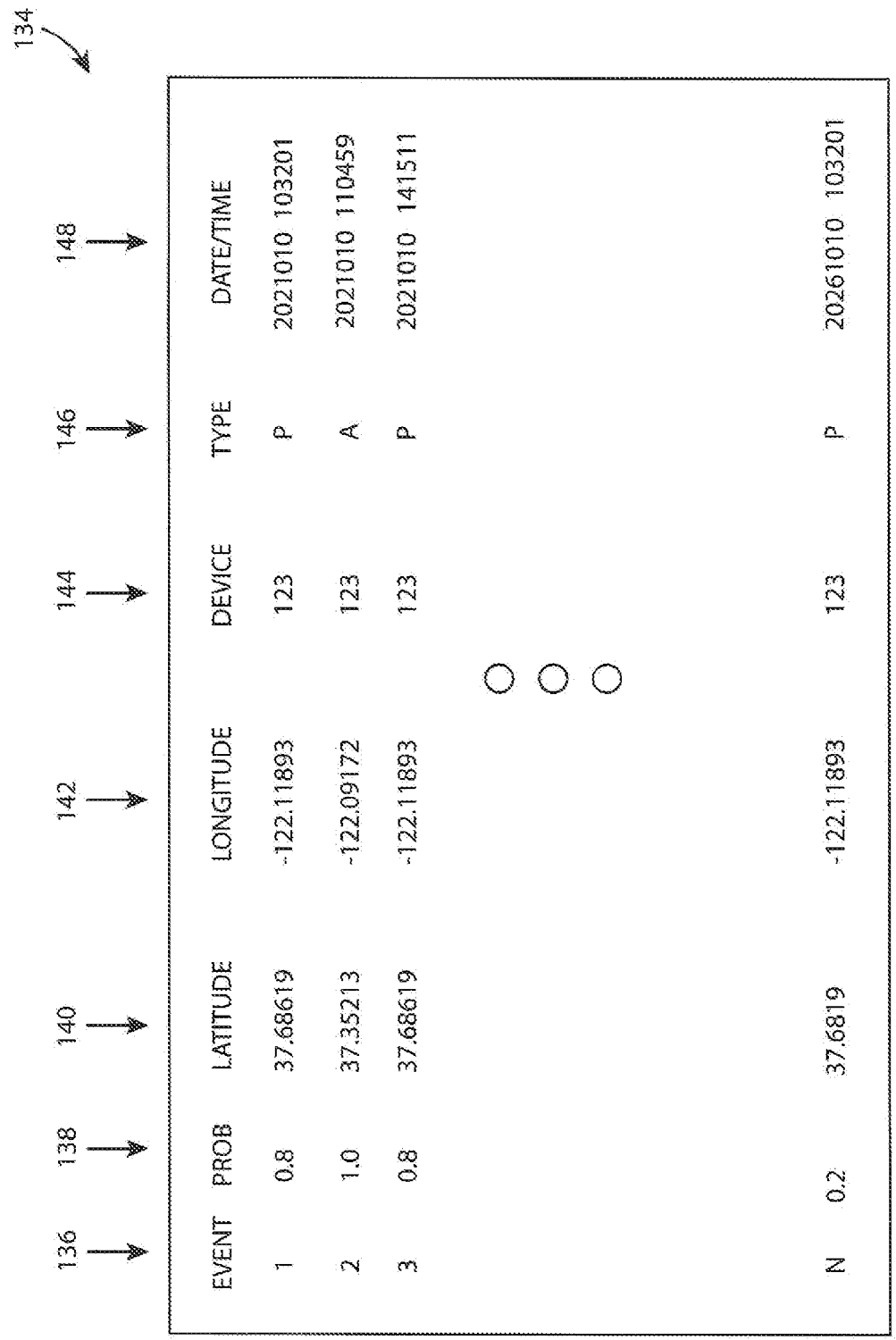
FIG. 7 is a table representing a database of future geofence events.

FIG. 7 is a table representing an example database of future geofence events. As will be appreciated by those of skill in the art, there are many other types of distributed and non-distributed database architectures that can be used. In this example, the predicted geofence events are set forth in rows, with an event number column 136, a confidence column 138, a latitude column 140, a longitude column 142, a device column 144, a type column 146, and a time/date 148.

Starting with Event 1, in this example, the confidence value for the geofence event prediction is 0.8 in the range of 0.0 to 1.0. The confidence, chance, or likelihood that a geofence event prediction can be dependent upon a variety of factor, including data set size, location, etc. For example, using two historical geofence events to predict the next similar geofence event will likely be of low probability, e.g. towards the lower end of the confidence range. However, determining a pattern using hundreds to historical geofence events to predict the next similar geofence event may be of high probability, e.g. towards the upper end of the confidence range. These confidence levels can be adjusted, e.g. in operation 128 of process 106, as can the predicted latitude and longitude of columns 140 and 142.

Column 144 is a device identification (ID) for a mobile device. If the prediction database is only storing geofence event, predictions for a single device (as in this example), this column can be eliminated. However, if the prediction database is storing geofence predictions for a number of devices, this column can be used to distinguish between them.

Column 146 includes the type of geofence event. In this example there are two types: prediction (P) and actual (A). An actual geofence event can be obtained, for example, from the geofence event engine 74 of FIG. 3. The confidence in an actual geofence event is 1.0, as it actually happened at that time and place. By analyzing the difference between the predicted and actual geofence events, future predictions can be made more accurate. Column 148 shows the predicted or actual date/time of the geofence event.

Although various embodiments have been described using specific terms and devices, such description is for illustrative purposes only. The words used are words of description rather than of limitation. It is to be understood that changes and variations may be made by those of ordinary skill in the art without departing from the spirit or the scope of various inventions supported by the written disclosure and the drawings. In addition, it should be understood that aspects of various other embodiments, may be interchanged either in whole or in part. It is therefore intended that the claims be interpreted in accordance with the true spirit and scope of the invention without limitation or estoppel.

What is claimed is:

1. A geofence event prediction method comprising:
retrieving non-contemporaneous geofence predictor data of a mobile device including both past geographic data and future geographic data, wherein the future geographic location data includes a calendar having at least one future appointment;
retrieving geofence data of the mobile device;
developing a future geofence event prediction from the non-contemporaneous geofence predictor data and the geofence data that includes a determination of a latitude, a longitude, a time and a date for the future geofence event prediction, wherein developing the future geofence event prediction includes determining if a geographic location of at least one future appointment is within at least one geofence;
calculating a confidence level for the future geofence event prediction; and
storing the latitude, longitude, time, date and confidence level of the future geofence event prediction in a database of future geofence event predictions.

2. A geofence event prediction method as recited in claim 1 wherein the past geographic location data includes geographic locations, dates, and times of each of a plurality of past geofence events.

3. A geofence event prediction method as recited in claim 2 wherein developing the future geofence event prediction includes detecting a pattern in the plurality of past geofence events.

4. A geofence event prediction method as recited in claim 3 wherein developing the future geofence event prediction further includes extrapolating the future geofence prediction from the detected pattern in the plurality of past geofence events.

5. A geofence event prediction method as recited in claim 4 wherein the past geographic location data was derived from at least one of GPS, beacon, and WiFi signals.

6. A mobile device with geofence event prediction as recited in claim 3 wherein developing the future geofence event prediction further includes extrapolating the future geofence prediction from the detected pattern in the plurality of past geofence events.

7. A mobile device with geofence event prediction as recited in claim 6 wherein the past geographic location data was derived from at least one of GPS, beacon, and WiFi signals.

8. A geofence event prediction method as recited in claim 1 further comprising accessing the database of future geofence event predictions if mobile device movement data is detected.

9. A geofence event prediction method as recited in claim 8 wherein the mobile device movement data includes at least one of GPS, Bluetooth, WiFi, or acceleration data.

10. A geofence event prediction method as recited in claim 8 wherein a new future geofence event is created using the mobile device movement data.

11. A geofence event prediction method as recited in claim 10 wherein the new future geofence event is mapped against the database of future geofence event predictions.

12. A geofence event prediction method as recited in claim 11 wherein the database of future geofence event predictions is updated by at least one of adding the new future geofence event or modifying an existing future geofence event to which the new future geofence event maps.

13. A non-transitory computer readable media including code segments executable on a digital processor for:
   retrieving non-contemporaneous geofence predictor data of a mobile device including both past geographic location data and future geographic location data, wherein the future geographic location data includes a calendar having at least one future appointment;
   retrieving geofence data of the mobile device;
   developing a future geofence event prediction from the non-contemporaneous geofence predictor data and the geofence data that includes a determination of a latitude, a longitude, a time and a date for the future geofence event prediction, wherein developing the future geofence event prediction includes determining if a geographic location of at least one future appointment is within at least one geofence;
   calculating a confidence level for the future geofence event prediction; and
   storing the latitude, longitude, time, date and confidence level of the future geofence event prediction in a database of future geofence event predictions.

14. A mobile device with geofence event prediction comprising:
   a digital processor;
   a GPS unit coupled to the digital processor;
   a WiFi unit coupled to the digital processor;
   a Bluetooth unit coupled to the digital processor;
   an accelerometer coupled to the digital processor; and
   non-transitory computer readable including code segments executable on the digital processor for:
      retrieving non-contemporaneous geofence predictor data of a mobile device including both past geographic data and future geographic data, wherein the future geographic location data includes a calendar having at least one future appointment;
      retrieving geofence data of the mobile device;
      developing a future geofence event prediction from the non-contemporaneous geofence predictor data and the geofence data that includes a determination of a latitude, a longitude, a time and a date for the future geofence event prediction, wherein developing the future geofence event prediction includes determining if a geographic location of at least one future appointment is within at least one geofence;
      calculating a confidence level for the future geofence event prediction; and
      storing the latitude, longitude, time, date and confidence level of the future geofence event prediction in a database of future geofence event predictions.

15. A mobile device with geofence event prediction as recited in claim 14 wherein the past geographic location data includes geographic locations, dates, and times of each of a plurality of past geofence events.

16. A mobile device with geofence event prediction as recited in claim 15 wherein developing the future geofence event prediction includes detecting a pattern in the plurality of past geofence events.

* * * * *